Nov. 24, 1931. T. C. RUSSELL 1,833,594
THERMOSTATIC APPARATUS
Filed March 10, 1930 2 Sheets-Sheet 2
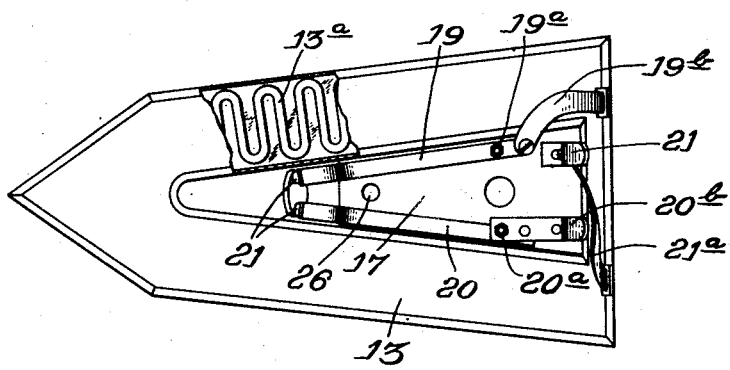
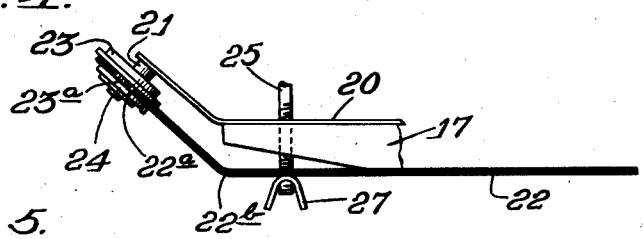
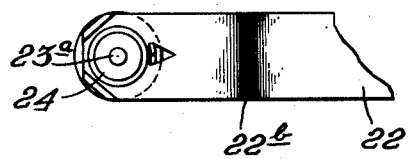
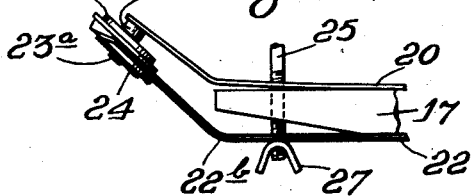
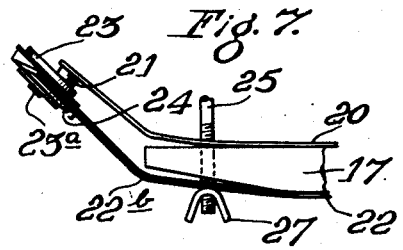
Inventor.
Thomas C. Russell.
By Dyrenforth, Lee, Chritton and Wiles
Attys.

Patented Nov. 24, 1931

1,833,594

UNITED STATES PATENT OFFICE

THOMAS C. RUSSELL, OF CHICAGO, ILLINOIS, ASSIGNOR TO SOLAR INDUSTRIES, INC., OF CHICAGO, ILLINOIS, A CORPORATION OF ILLINOIS

THERMOSTATIC APPARATUS

Application filed March 10, 1930. Serial No. 434,659.

This invention relates to improvements in thermostats or thermostatic apparatus and, more especially, such a device particularly adapted for controlling electric heating appliances.

For purposes of illustration, my improved thermostat is here shown embodied in an electric flat iron.

Among the features of my invention is the provision of such a device that may be easily and cheaply manufactured and that is reliable and accurate in operation.

Another feature of my invention is the arrangement of the thermostatic or bi-metal element in close proximity to or in contact with the sole plate of the iron or the heating member of the appliance with which the thermostat is used. When so placed, the element will very quickly respond to changes in temperature of the sole plate or other heating member and give quick, fine and accurate control.

Another feature is the novel construction in which the thermostatic element itself is not a conductor of electricity, thus preventing inaccuracy of adjustment due to the heating of the bar by the resistance thereof to the passage of current.

I also provide a rotating connecting member which produces a rubbing or wiping action as it connects the contacts, thus cleaning the same and insuring a good connection at each operation. This cleaning takes place only when the parts are relatively cool, thus materially reducing the wear on the same.

The contacts are mounted on spring bars so that some movement of the thermostatic element is permitted before the electric connection is broken. This construction permits the apparatus to be set to obtain a relatively high degree of heat before the current is shut off.

Another feature of my invention is the provision of two contacts so that the apparatus will function even if one contact sticks to the connecting member.

I also provide a relatively short thermostatic element with a kink or sharp bend in it instead of a long bar. The kink or sharp bend will give sufficient movement to the end. The weight and objectionable vibration of the end of a long bar is thus avoided.

I also provide means for adjusting the apparatus including a nut with a rounded top under the thermostatic element, thus furnishing a support for the element in all positions without injury to it or impairment of its functioning.

Other features and advantages of my invention will appear more fully as I proceed with my specification.

In that form of device embodying the features of my invention shown in the accompanying drawings—

Figure 1:
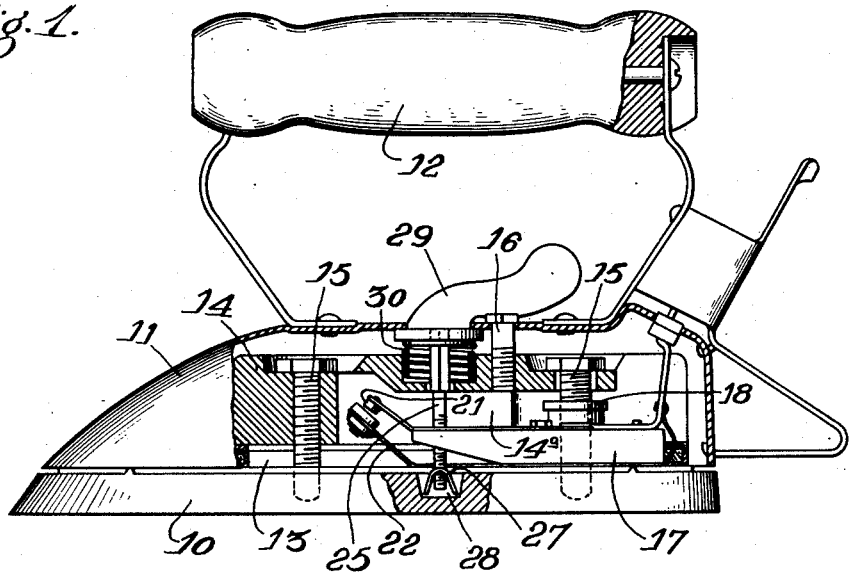
Figure 2:
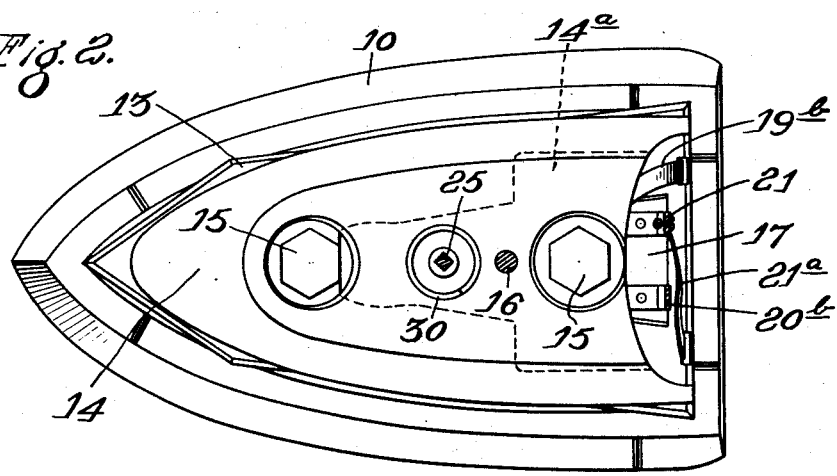

Figure 1 is a vertical sectional view, partly in side elevation, showing a flat iron with the improved thermostat; Fig. 2 is a top plan view showing the cover removed; Fig. 3 is a top plan view of the heating element and thermostat showing the same removed from the iron; Fig. 4 is a view in side elevation, partly in section, of the thermostat; Fig. 5 is a similar top plan view; and Figs. 6 and 7 are views similar to Fig. 4 showing the parts in different positions.

As shown in the drawings, the flat iron may include the sole plate or heating member 10, the cover 11, and handle 12. Numeral 13 indicates the heating element here shown as substantially triangular in shape and containing the usual electric resistance wire 13ª. The heating element 13 lies on top of the sole plate 10. Numeral 14 indicates the body part of the iron on top of the heating element 13. This body part 14 is provided with a recess or cavity 14ª which accommodates the thermostatic apparatus to be hereinafter described. The body part 14 may be held in place by the two screws 15, 15 extending through the same and screwed into the sole plate 10. The cover 11 may be attached by means of a screw 16 extending into the body part 14.

The thermostatic apparatus includes a supporting block 17 made of lava or other suitable insulating material, and held in position by means of the nut 18 on the screw 15, said insulating block being triangular shaped, positioned inside of the triangular heating element 13, and held down against the sole-plate 10 by the screw 18.

Numerals 19 and 20 indicate spring bars attached to the upper surface of the supporting block 17 by bolts 19ª and 20ª, respectively. These spring bars carry at their ends the contacts 21, 21. These bars are a part of the electric circuit, the end of the bar 19 being connected by the lead 19ᵇ to one end of the resistance wire 13ª. The end of the bar 20 is connected to one of the terminals 20ᵇ of the iron adapted to receive the current supply. The other terminal 21 of the iron is connected by the lead 21ª to the other end of the resistance wire 13ª.

Numeral 22 indicates the bi-metal which lies under the supporting block 17 and in contact with the sole plate of the iron. It is to be noted that this element is not used as a conductor of current. On the end of the bi-metal element 22 is a rotatable connecting member 23 adapted to bridge or connect the contacts 21 when raised by bending of the element 22. The rotatable mounting of the connecting member is provided by means of a short pin 23ª extending through a hole 22ª in the end of the element 22, said pin carrying a washer 24 on its lower end. The rotatable connecting member 23 produces a rubbing or wiping action as it connects the contacts 21, 21.

The bi-metal element 22 is provided with a kink or sharp bend 22ᵇ near its end. As the element heats and cools, the major part of the movement of the connecting member 23 will be caused by bending of the element 22 substantially at the point 22ᵇ.

Adjusting means are provided including the vertical screw 25 extending through the hole 26 in the block 17. This screw has threaded on its lower end the nut 27, rectangular in shape, and held against rotation in the rectangular shaped hole or socket 28 in the sole plate 10. It is to be noted that the upper surface of the nut 27 is formed like a transversely-arranged rounded ridge on which the element 22 rests. The upper end of the screw 25 is squared and fitted in a socket in the regulating handle 29 rotatably mounted in the cover 11 and held in position by the spring 30. By rotating the screw 25, the nut 27 may be raised or lowered, thus raising or lowering the element 22 to vary the degree at which the current break will occur.

In the operation of the device, the connecting member 23 connects the contacts 21, 21, when the element 22 is cold. When in this position, the springs 19 and 20 are preferably lifted or spring upwardly somewhat above the block 17, as shown in Figs. 6 and 7, where two different adjustments are shown. As the element 22 becomes heated, the kink or bend 22ᵇ straightens out, thus moving the connecting member 23 downwardly. As this occurs, the contacts 21, 21 are moved downwardly by the springs 19 and 20, and the rubbing action, above referred to, takes place; but the electrical contact is not broken until the springs 19 and 20 come down on top of the block 17, as shown in Figs. 1 and 4, and further downward movement of the contacts 21, 21 thus prevented. Further downward movement of the connecting member 23 then causes it to separate from one or both of the contacts 21, 21, breaking the connection in either case. The exact temperature at which the break occurs can be regulated by adjustment of the nut 27, as above described.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I regard as new, and desire to secure by Letters Patent, is:

1. Apparatus of the character described, including; a thermostatic element carrying a connecting member moved back and forth as the element is heated and cooled; a pair of contacts adjacent the connecting member adapted for movement in a path substantially, but not exactly, in line with the direction of movement of the connecting member; spring means urging the contacts in the direction that the connecting member moves as the thermostatic element is heated and pressing the same against said member when the element is cold; and a stop to limit movement of one or both of the contacts in the direction that the connecting member moves as the thermostatic element is heated.

2. Apparatus as claimed in claim 1, in which the spring means urging the contacts are spring conductor bars on which the contacts are mounted.

3. Apparatus as claimed in claim 1, in which the connecting member is rotatably mounted on the thermostatic element.

4. Apparatus as claimed in claim 1, in which the stop does not limit movement of one or both of the contacts until they have moved some distance with and in rubbing contact with the connecting member.

5. Apparatus as claimed in claim 1, in which the thermostatic element is provided with a kink or bend adapted to be relatively straightened as the element is heated, said straightening causing movement of the connecting member.

6. Apparatus as claimed in claim 1, in which there is provided an adjusting rest for the thermostatic element with a ridge in contact with the element, and means for moving the rest in a direction toward or away from the element to vary the path of movement of the connecting member.

7. Apparatus as claimed in claim 1, in which there is provided an adjusting rest for the thermostatic element with a part in contact with the element, and means for moving the rest in a direction toward or away from the element to vary the path of movement of the connecting member.

In witness whereof, I have hereunto set my hand and seal this 26th day of February, 1930.

THOMAS C. RUSSELL.